J. P. POWERS.
POWER DUMPING WAGON.
APPLICATION FILED SEPT. 27, 1912.
1,065,271.
Patented June 17, 1913.
3 SHEETS—SHEET 1.
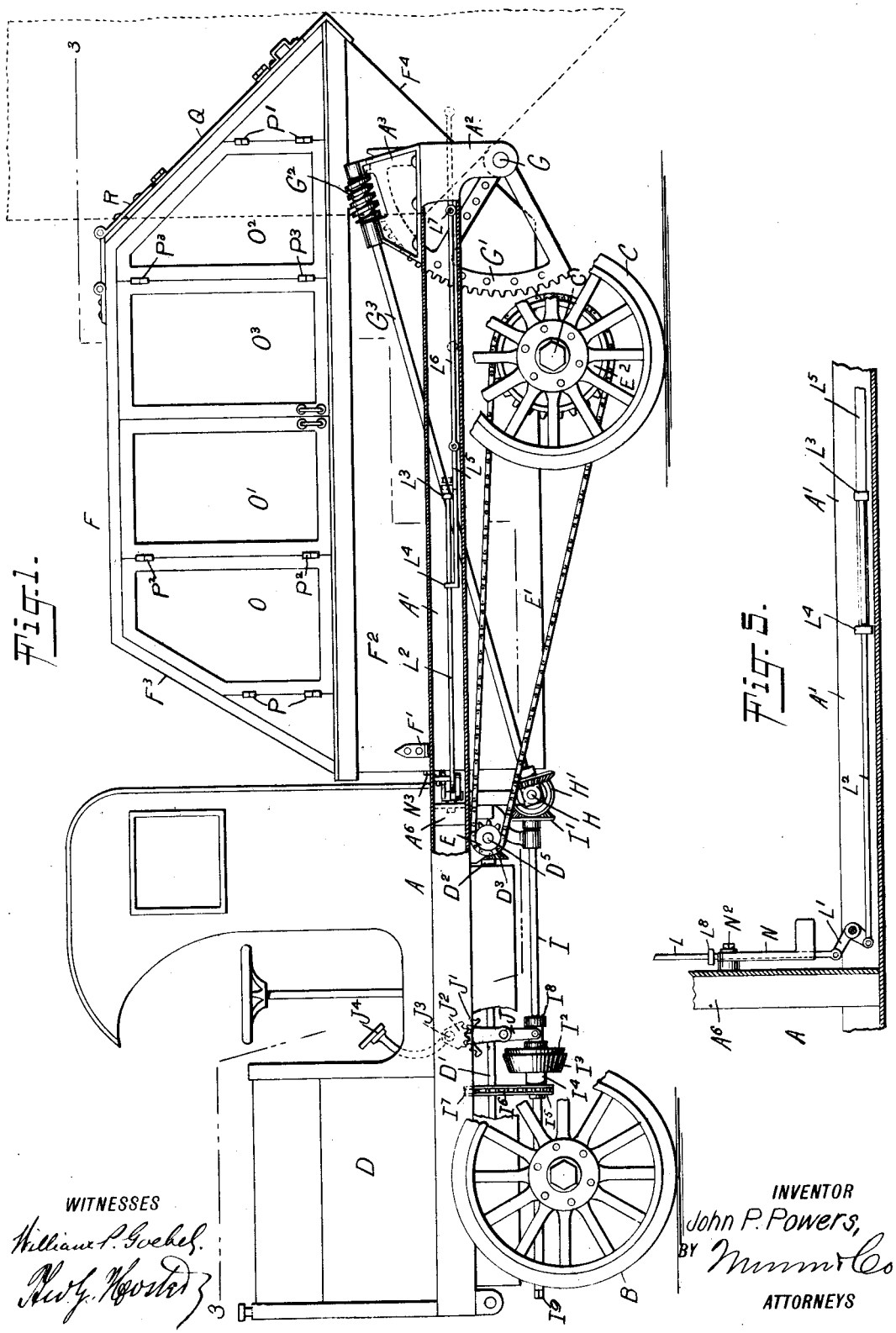
WITNESSES
INVENTOR
John P. Powers,
BY
ATTORNEYS

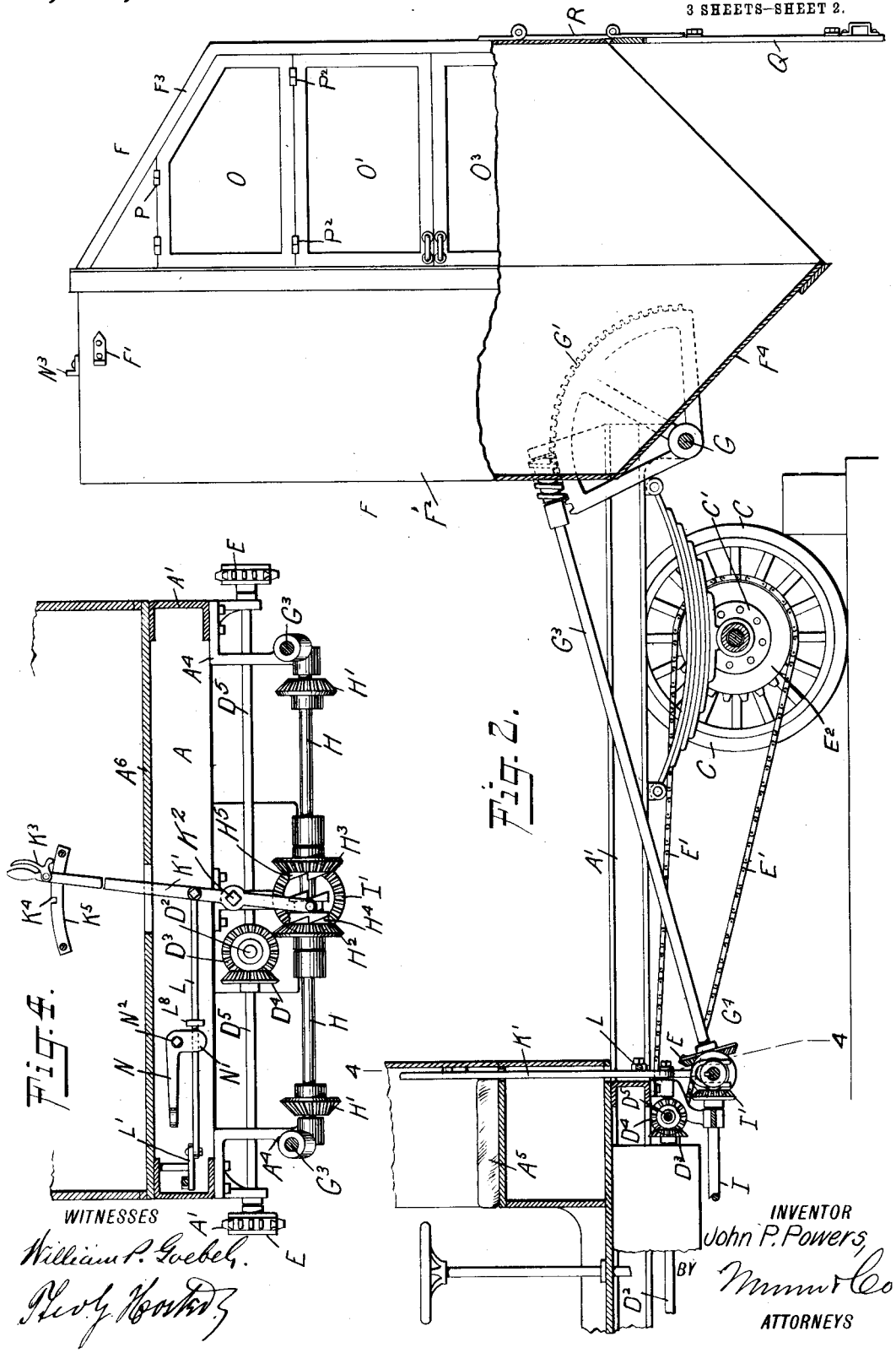

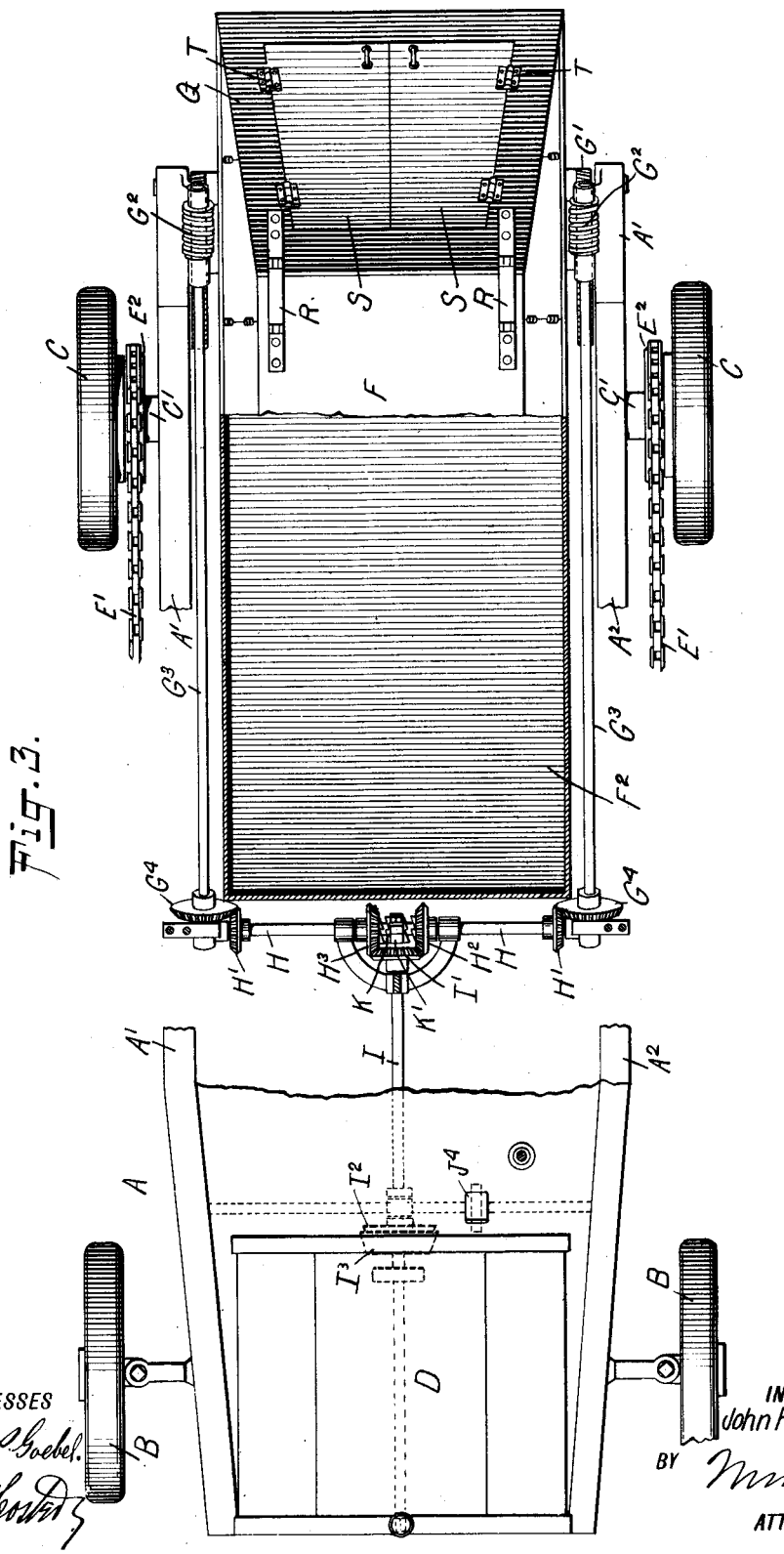

UNITED STATES PATENT OFFICE.

JOHN P. POWERS, OF OSSINING, NEW YORK.

POWER DUMPING-WAGON.

1,065,271.  Specification of Letters Patent.  Patented June 17, 1913.

Application filed September 27, 1912. Serial No. 722,601.

*To all whom it may concern:*

Be it known that I, JOHN P. POWERS, a citizen of the United States, and a resident of Ossining, in the county of Westchester and State of New York, have invented a new and improved Power Dumping-Wagon, of which the following is a full, clear, and exact description.

The object of the invention is to provide a new and improved power-dumping wagon, for carrying garbage, refuse, ashes, coal and other materials, and arranged to utilize the motive power for propelling the wagon and for moving the wagon body thereof from normal or loading position into dumping position and vice versa, to permit convenient loading of the body when in normal horizontal position and to insure a complete discharge of the contents of the wagon body at the time the latter is in dumping position.

For the purpose mentioned, use is made of a truck having a motor, or driving connection between the motor and the said truck for propelling the wagon, and a connection between the motor and the wagon body for moving the latter from normal horizontal position into dumping position.

A practical embodiment of the invention is represented in the accompanying drawings forming a part of this specification, in which similar characters of reference indicate corresponding parts in all the views.

Figure 1 is a side elevation of the power-dumping wagon and showing the wagon body in normal or loading position, parts of the wagon body being broken out and parts appearing in section. Fig. 2 is a similar view of the same and showing the wagon body in dumping position; Fig. 3 is a sectional plan view of the power-dumping wagon on the line 3—3 of Fig. 1; Fig. 4 is a transverse section of the same on the line 4—4 of Fig. 2; and Fig. 5 is a sectional plan view of part of the automatic stopping device for disconnecting the actuating means for the wagon body from the driven shaft at the time the body reaches the end of its normal or its dumping position.

The truck A of the power-dumping wagon is similar to the ones now generally employed and known as automobile trucks, and the truck is provided with the usual front or steering wheels B and the rear or traction wheels C driven from a motor D, preferably mounted on the front end of the truck A, as plainly indicated in the drawings. The motor shaft D' is connected with the usual speed and reversing gear under the control of the operator in charge of the power-dumping wagon, to rotate a shaft $D^2$ in either a forward or backward direction. The rear end of the shaft $D^2$ is connected with a bevel gear wheel $D^3$ (see Fig. 4) in mesh with a bevel gear wheel $D^4$ secured on a transversely-extending shaft $D^5$ journaled on the truck A, and on the outer end of the shaft $D^5$ are secured sprocket wheels E connected by sprocket chains E' with sprocket wheels $E^2$ secured on the hubs C' of the rear wheels C so that when the motor D is running and the shaft $D^2$ is rotated motion is transmitted to the sprocket wheels $E^2$ by the connection described to propel the dumping wagon forward or backward according to the direction in which the shaft $D^2$ is turned.

The truck A is provided with side beams A', preferably of channel iron, and between the rear portion of the said side beams extends normally the lower portion of a wagon body F mounted to swing from normal horizonal position, as shown in Fig. 1, to an approximately vertical dumping position, as indicated in Fig. 2. For the purpose mentioned, use is made of a transverse shaft G journaled in the lower ends of hangers $A^2$ depending from the rear ends of the side beams A', so that the shaft G is located a distance below the side beams and somewhat in the rear of the rear or traction wheels C. The shaft G is provided with segmental worm wheels G' secured to the sides of the wagon body F at the rear end thereof, so that the rear portion of the wagon body F is supported from the side beams A' of the truck. The front end of the body F is provided with supporting lugs F' adapted to rest on the side beams A' at the time the wagon body F is in the normal horizontal or loading position.

The segmental worm wheels G' are in mesh with worms $G^2$ secured on shafts $G^3$ journaled in bearings $A^3$, $A^4$ attached to the truck A, as indicated in Figs. 1 and 4. The forward ends of the shafts G³ are provided with bevel gear wheels G⁴ in mesh with bevel gear wheels H' secured on a transverse shaft H journaled in the bearings A⁴, and on the said shaft H are mounted to turn loosely bevel gear wheels H², H³, spaced apart and facing each other, as plainly indicated in Fig. 4. The bevel gear wheels H² and H³ are in mesh at all times with a bevel gear wheel I' secured on a longitudinally-extending shaft I journaled on the truck A and adapted to be driven from the motor shaft D'. For this purpose a friction clutch member I² is mounted to turn with and to slide on the shaft I and is adapted to engage a friction clutch member I³ mounted to rotate loosely on the shaft I. On the hub I⁴ of this clutch member I³ is secured a sprocket wheel I⁵ connected by a sprocket chain I⁶ with a sprocket wheel I⁷ secured on the motor shaft D', so that when the motor D is running a rotary motion is given to the clutch member I³ and when the clutch member I², is thrown in mesh with the clutch member I³ then a rotary motion is given to the shaft I. A shifting lever J fulcrumed on the truck A engages the hub I⁸ of the clutch member I², and the upper end of the lever J is provided with a segmental gear wheel J' in mesh with a segmental gear wheel J² secured on a shaft J³ journaled on the truck A and carrying a foot lever J⁴ under the control of the attendant of the power-dumping wagon to permit the attendant to throw the clutch member I² in or out of mesh with the clutch member I³. It is understood that normally the clutch member I² is out of mesh with the clutch member I³ and is only thrown in mesh with the said clutch member I³ at the time the attendant presses the foot lever J⁴. The forward end I⁹ of the shaft I is made polygonal to permit of applying a crank or other tool with a view to allow of turning the shaft by hand whenever it is desired to do so.

The opposite faces of the bevel gear wheels H², H³ previously mentioned are provided with clutch members H⁴, H⁵ adapted to be engaged by a double clutch member K mounted to turn with and to slide on the transverse shaft H, and the said double clutch member K is engaged by a shifting lever K' pivoted at K² on the truck A and extending upward to be within convenient reach of the attendant in charge of the power-dumping wagon and seated on a seat A⁵ mounted on the truck A (see Fig. 2). The upper end of the shifting lever K' is provided with a locking catch K³ adapted to engage a notch K⁴ in a segment K⁵ fixed to the back of the seat A⁵. The double clutch member K is so arranged relative to the clutch members H⁴, H⁵ that when the double clutch member K is in intermediate position it is out of engagement with the clutch members H⁴, H⁵. When it is desired to impart an upward swinging motion to the wagon body F at the time the shaft I is driven then the operator swings the shifting lever K' to one side so as to engage the double clutch member K with the clutch member H⁴ to transmit the rotary motion of the bevel gear wheel H² to the shaft H, which by the bevel gear wheels H', G⁴ rotates the worm shafts G³ and the latter by the worms G² engaging the worm wheels G' impart an upward swinging motion to the wagon body F. When the lever K' is moved in the opposite direction from normal dormant position then the double clutch member K is thrown into mesh with the clutch member H⁵ so that the rotary motion of the bevel gear wheel H³ is transmitted to the shaft H to rotate the latter in a reverse direction, and consequently the shaft G³ and the worms G² are rotated in the reverse direction to swing the wagon body F from the vertical dumping position back into the normal horizontal or loading position.

In order to automatically throw the double clutch member K out of mesh with either the clutch member H⁴ or the clutch member H⁵ at the time the wagon body F reaches the vertical or dumping position or the horizontal or loading position, the following arrangement is made: The lever K' is pivotally connected by a link L with a bell crank lever L' (see Figs. 4 and 5) fulcrumed on one of the side beams A' and pivotally connected with a rod L² extending rearwardly and terminating in a collar L³. The rod L² slidingly engages a bearing L⁴ on the rod L⁵ pivotally connected with a link L⁶ attached at its rear end at L⁷ to one side of the wagon body F near the rear end thereof. Now when the double clutch member K is in engagement with the clutch member H⁴ and the wagon body F swings upward into dumping position then a pull is exerted by the said wagon body F on the link L⁶ which pulls the rod L⁵ rearwardly so that the bearings L⁴ thereof finally moves into engagement with the collar L³ at the time the body F nears a vertical position. A further upward swinging movement of the body F then causes the bearing L⁴ to move the collar L³ rearwardly and with it the rod L² so that a swinging motion is given to the bell crank lever L' which by the link L imparts a swinging motion to the shifting lever K' whereby the clutch member K is moved out of engagement with the clutch member H⁴ and is moved into an intermediate or dormant position and consequently the rotation of the shaft H ceases and with it the further upward swinging movement given to the wagon body F at the time the latter reaches a vertical dumping position. The link L is provided with a collar L⁸ adapted to abut against one end N' of a lever N fulcrumed at N² on a cross beam A⁶ forming part of the truck and extending from one side beam A' to the other. The free end of the lever N is adapted to be engaged by a lug N³ secured to the forward end of the wagon body F at the time the latter returns to normal position. As previously stated, a return swinging motion is given to the wagon body F at the time the double clutch member K is in mesh with the clutch member H⁵, and at this time the collar L⁸ is in engagement with the end N' of the lever N, and when the wagon body F nears its normal horizontal position the lug N³ engages the lever N and imparts a swinging motion thereto so that the link L is pushed to the right and in doing so a swinging motion is given to the lever K' to move the double clutch member K out of engagement with the clutch member H⁵ and to move the said double clutch member K into intermediate dormant position. It is understood that when this takes place the rotation of the shaft H and consequently of the shafts G³ ceases and the wagon body F is then in normal horizontal position with its lugs F' resting on the side beams A'.

The wagon body F consists essentially of a lower water-tight compartment F² and a closed superstructure F³ mounted on top of the water-tight compartment F². The rear end F⁴ of the water-tight compartment F² is beveled upwardly and rearwardly so that when the wagon body F is swung up into vertical dumping position then the contents of the compartment F² are readily discharged by sliding over the now downwardly and rearwardly inclined end F⁴ (see Fig. 2). The closed superstructure F³ is provided on each side with sectional doors O, O' and O², O³, of which the sections O and O² are connected by hinges P, P' with the side of the superstructure while the sections O and O' are connected with each other by hinges P², and hinges P³ connect the sections O², O³ with each other to allow of folding the sections O' and O³ back onto the sections O and O² whenever it is desired to roll a barrel or a similar receptacle inside of the superstructure F³ while emptying such barrel. It is understood that ordinarily the sections O' and O³ are only opened for filling the body with garbage, refuse or other articles to be carried by the power-dumping wagon. It will also be noticed that when the doors are completely open the material can be readily distributed throughout the length of the wagon body.

The rear end of the superstructure F³ is normally closed by an end gate Q connected by double hinges R to the top of the superstructure F³ to permit the end gate Q to readily swing into an open position at the time the body F is swung into vertical dumping position, the double hinges R permitting the end gate Q to swing outwardly in case the lower end of the end gate Q should strike pavement or other obstruction at the place of dumping. The end gate Q is provided with filling doors S adapted to swing open sidewise by arranging hinges T at the sides of the doors, as is plainly indicated in Fig. 3. It is understood that these doors S are used for filling the rear end of the wagon body F at the time the latter is in normal horizontal or loading position but when the body F is moved into dumping position the doors are held closed by suitable locking means.

By the arrangement described the power-dumping wagon when loaded can be readily backed up against the string-piece of a pier or the like, as shown in Fig. 2, and then the wagon body F is swung up into a vertical or dumping position, it being understood that when the wagon body nears a vertical position the gate Q automatically swings into open position to allow the ready discharge of the contents of the wagon body. It will also be noticed that by providing the watertight compartment F² with the inclined end F⁴ the latter projects the discharging material a distance beyond the stringpiece and without danger of the end itself striking the stringpiece. When the several parts are in the position shown in Fig. 1, the power-dumping wagon can be readily propelled from place to place by power derived from the motor D, and on opening the doors O, O', O², O³ and S the wagon body F can be loaded with garbage, ashes or other refuse or materials. When the wagon body F is filled the wagon is run to the dumping place, such as a pier or the like, and usually backed up against the stringpiece of the pier, as indicated in Fig. 2. The attendant in charge of the power-dumping wagon now stops the driving gear without however stopping the motor D. As soon as the wagon is in position for dumping, the attendant presses the foot lever J⁴ to connect the motor shaft D' with the shaft J to rotate the latter and at the same time the attendant moves the lever K' from its normal dormant position to the right (see Fig. 4) to engage the double clutch member K with the clutch member H⁴. When this takes place the rotary motion of the shaft I is transmitted to the shaft H which by the gear wheels H', G⁴ rotates the shaft G³ to cause the wagon body F to move upward into dumping position owing to the worms G² driving the worm wheels G'. When the wagon body F reaches the vertical position shown in Fig. 2, then the lever K' is automatically shifted into the dormant position by the action of the bars L⁶, L⁵ and L², and the bell crank lever L' and link L, as previously described, so that further upward swinging of the wagon body F ceases. The end gate Q of the wagon body F readily swings open during the upward swinging of the wagon body, and the contents of the latter readily slide out to a place of dumping, which may be a barge or the like.

After the contents of the wagon body have been completely discharged the attendant moves the lever K' to the left, so that the double clutch member K is now thrown out of engagement with the clutch member H⁵ to rotate the shafts H and G³ in the reverse direction to swing the wagon body F downward back to normal position, and when the wagon body F nears the normal position the lug N³ acts on the lever N to return the lever K' to normal dormant position, as previously explained. The attendant now again starts the driving mechanism to propel the power-dumping wagon away from the place of dumping to gather up another load.

By arranging the wagon body F between the side beams A' of the truck the center of gravity is placed as low as possible and likewise the doors O, O', O², O³ and Q to reduce the height to which the garbage cans, boxes and like receptacles have to be lifted when emptying the same in the wagon body and at the same time it is possible to construct the wagon body with a water-tight compartment F² to prevent leakage or dripping of any moisture that may be loaded into the wagon body.

Having thus described my invention, I claim as new and desire to secure by Letters Patent:

1. A power-dumping wagon comprising a truck, a wagon body pivoted on the truck, a segmental worm wheel on each side of the said wagon body, worm shafts journaled on opposite sides of the truck, one of which worm shafts carries a right hand worm in mesh with one of the worm wheels, and the other of which worm shafts carries a left hand worm in mesh with the other worm wheel, a transverse shaft geared with the said worm shafts, a pair of bevel gear wheels mounted to rotate loosely on the said transverse shaft and provided with clutch members, a driven shaft provided with a bevel gear wheel in mesh with the said pair of loose gear wheels, a shifting clutch member rotating with the said transverse shaft and adapted to engage either of the said loose gear wheels, and a hand shifting lever for the said shifting clutch member.

2. A power-dumping wagon comprising a truck, a wagon body pivoted on the truck, a segmental worm wheel on each side of the said wagon body, worm shafts journaled on opposite sides of the truck, one of which worm shafts carries a right hand worm in mesh with one of the said worm wheels, and the other of which worm shafts carries a left hand worm in mesh with the other worm wheel, a transverse shaft geared with the said worm shafts, a pair of bevel gear wheels mounted to rotate loosely on the said transverse shaft, a driven shaft provided with a bevel gear wheel in mesh with the said pair of loose gear wheels, a shifting clutch member rotating with the transverse shaft and adapted to engage either of the said loose gear wheels, a shifting lever for the said clutch member, and means mounted on the said truck and having connection with the said lever and actuated by the wagon body to automatically move the lever and the clutch member into inactive position at the time the wagon body reaches its extreme position in either direction.

3. A power dumping wagon, comprising a truck, a wagon body pivoted on the truck, a segmental worm wheel on the said wagon body, a worm shaft journaled on the truck and carrying a worm to mesh with the said worm wheel, a transverse shaft geared with the said worm shaft, a pair of beveled gear wheels mounted to rotate loosely on the said transverse shaft and provided with clutch members, a driven shaft provided with a beveled gear wheel in mesh with the said pair of loose gear wheels, a shifting clutch member rotating with the said transverse shaft and adapted to engage either of the said loose gear wheels, a hand shifting lever for the said shifting clutch member, a pair of longitudinal movable rods disposed alongside the wagon body and having a slidable connection at their contiguous ends whereby to permit of limited relative movement, the outer end of the rear rod being pivotally connected to the wagon body, a bell crank lever to which the inner end of the forward rod is connected, and a rod connecting the bell crank lever with the said shifting clutch member, all for the purpose described.

4. A power dumping wagon, comprising a truck, a wagon body pivoted on the truck, a segmental worm wheel on the said wagon body, a worm shaft journaled on the truck and carrying a worm in mesh with the said worm wheel, a transverse shaft geared to the said shaft, a pair of beveled gear wheels mounted to rotate loosely on the said transverse shaft and provided with clutch members, a driven shaft provided with a beveled gear wheel in mesh with the said pair of loose gear wheels, a shifting clutch member rotating with the said transverse shaft and adapted to engage either of the said loose gear wheels, a hand shifting lever for the said shifting clutch member, connections between the said shifting clutch member and the rear portion of the body whereby to move said member into inactive position when the wagon reaches the dumping position, and including a connecting rod having a rigid collar, a lever pivoted on the truck and having an angular portion adapted to be engaged by the collar, and a lug carried by the forward portion of the wagon body and adapted to engage and move the said lever when the wagon body is lowered to normal position on the truck, all for the purpose described.

In testimony whereof I have signed my name to this specification in the presence of two subscribing witnesses.

JOHN P. POWERS.

Witnesses:
 MILTON C. PALMER,
 HENRY A. SCHAFMEISTER.